(12) United States Patent
Nguyen (10) Patent No.: US 7,453,874 B1
(45) Date of Patent: Nov. 18, 2008

(54) METHOD AND SYSTEM FOR INCREMENTALLY UPDATING A CHECKSUM IN A NETWORK DATA PACKET

(75) Inventor: Kha H. Nguyen, Foster City, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 751 days.

(21) Appl. No.: 10/814,545

(22) Filed: Mar. 30, 2004

(51) Int. Cl.
*H04L 12/28* (2006.01)
(52) U.S. Cl. ........................ 370/389; 370/392
(58) Field of Classification Search .......... None
See application file for complete search history.

(56) References Cited

U.S. PATENT DOCUMENTS

| | | | |
|---|---|---|---|
| 6,034,957 A | 3/2000 | Haddock et al. | |
| 6,295,299 B1 | 9/2001 | Haddock et al. | |
| 6,381,242 B1 | 4/2002 | Maher, III et al. | |
| 6,643,821 B2 * | 11/2003 | Karim et al. | 714/801 |
| 6,914,905 B1 | 7/2005 | Yip | |
| 6,917,617 B2 | 7/2005 | Jin et al. | |
| 6,957,258 B2 | 10/2005 | Maher, III et al. | |
| 2001/0036196 A1 * | 11/2001 | Blightman et al. | 370/465 |
| 2003/0193949 A1 | 10/2003 | Kojima et al. | |
| 2004/0003110 A1 | 1/2004 | Ozguner | |
| 2004/0246981 A1 | 12/2004 | Zhiqun | |
| 2005/0015423 A1 * | 1/2005 | D'Arcy et al. | 708/530 |
| 2005/0074009 A1 | 4/2005 | Kanetake | |

FOREIGN PATENT DOCUMENTS

WO   WO 03/081857   10/2003

OTHER PUBLICATIONS

Van Ess, D., *A Circular FIFO, PSoC Style*, Cypress Microsystems, Application Note AN2036, Rev. B, pp. 1-5, Jun. 21, 2002.
Network Working Group, *RFC 1071—Computing the Internet Checksum*, Sep. 1988, available at: http://www.faqs.org/rfcs/rfc1071.html.
Network Working Group, *RFC 1141—Incremental Updating of the Internet Checksum*, Jan. 1990, available at: http://www.faqs.org/rfcs/rfc1141.html.
Network Working Group, *RFC 1624—Computation of the Internet Checksum via Incremental Update*, May 1994, available at: http://www.faqs.org/rfcs/rfc1624.html.
Netlogic Microsystems, Product Brief NSE5000GLQ, Copyright 2004, available at: http://www.netlogicmicro.com/datasheets/nse5000glq.html.
Zhang, Z., *Recovery of Memory and Process in DSM Systems: HA Issue#1*, Hewlett-Packard Co. HPL-2001-76, Mar. 30, 2001.

* cited by examiner

*Primary Examiner*—Duc C Ho
(74) *Attorney, Agent, or Firm*—Howrey LLP (57) ABSTRACT

An improved technique for incrementally updating a checksum in a network data packet is disclosed. A partial one's complement sum is first computed by subtracting the checksum value of certain packet header fields from the original data packet checksum. One or more of the packet header fields are then modified. An incrementally updated checksum is then computed by adding a checksum value of the modified packet header fields to the previously calculated partial one's complement sum. The updated checksum then replaces the original data packet checksum in the network data packet.

23 Claims, 5 Drawing Sheets

FIG. 1

Encapsulation of a TCP segment as an IP datagram
(PRIOR ART)

FIG. 2

Encapsulation of a UDP segment as an IP datagram
(PRIOR ART)

FIG. 3

IPv4 Header
(PRIOR ART)

FIG. 4

IPv6 Header
(PRIOR ART)

METHOD AND SYSTEM FOR INCREMENTALLY UPDATING A CHECKSUM IN A NETWORK DATA PACKET

RELATED APPLICATIONS

The following applications are commonly owned by the assignee hereof, are being filed on even date herewith, and are each incorporated by reference herein as though set forth in full:

| Application No. Filing Date | Title |
|---|---|
| 10/814,725 Mar. 30, 2004 | PACKET PROCESSING SYSTEM ARCHITECTURE AND METHOD |
| 10/814,552 Mar. 30, 2004 | PACKET PROCESSING SYSTEM ARCHITECTURE AND METHOD |
| 10/814,556 Mar. 30, 2004 | PACKET DATA MODIFICATION PROCESSOR |
| 10/814,728 Mar. 30, 2004 | SYSTEM AND METHOD FOR PACKET PROCESSOR STATUS MONITORING |
| 10/814,545 Mar. 30, 2004 | METHOD AND SYSTEM FOR INCREMENTALLY UPDATING A TCP/UDP CHECKSUM IN A NETWORK DATA PACKET |
| 10/814,729 Mar. 30, 2004 | SYSTEM AND METHOD FOR EGRESS PACKET MARKING |
| 10/814,731 Mar. 30, 2004 | SYSTEM AND METHOD FOR ASSEMBLING A DATA PACKET |
| 10/814,727 Mar. 30. 2004 | PACKET DATA MODIFICATION PROCESSOR COMMAND INSTRUCTION SET |
| 10/814,774 Mar. 30, 2004 | DATA STRUCTURES FOR SUPPORTING PACKET DATA MODIFICATION OPERATIONS |

FIELD OF THE INVENTION

This invention relates to computer networks and, specifically, to an improved technique for incrementally updating a one's complement checksum in a network data packet.

BACKGROUND OF THE INVENTION

Internet use has increased dramatically over the past five years. Both the number of users connecting to the Internet and applications requiring greater bandwidth have created the need to increase network bandwidth. Consequently, network designers are migrating to higher speed backbones, such as Gigabit Ethernet, to compensate for increased network traffic. Higher speed backbones place greater demands on network switching performance because network switches must complete data packet processing more efficiently if data packets are to be switched at higher rates.

In a packet switched network, network traffic consists of data packets that move from one network node to another. A node is any computer, printer, router, switch, gateway, or other device attached to the network. A network switch directs a data packet from one node to the next by reading information contained in the data packet header. Frequently, the network switch modifies one or more fields of the data packet header to complete this routing. This is especially true if the data packet crosses network domain boundaries or if the network switch performs operations such as load balancing or packet prioritization.

For a network switch to route a data packet properly, the structure of the data packet must conform to the protocol of the network. A computer that places information on the Internet generally complies with the Open System Interconnection (OSI) model where the protocol is divided into seven layers. Information that is sent from one computer to the next is normally generated in the Application layer (layer 7) of the source node by the user or software. The information is then sent to the Presentation layer (layer 6) where it is translated into a format that can be read by the destination node. Once translated, the information is then queued in the Session layer (layer 5) for managed control of the transmission. The Transport layer (layer 4), which receives the information from the Session layer, ensures that the data packet is successfully transferred between the two end nodes. The Network layer (layer 3) provides routing information for the data packet. The Data Link layer (layer 2), which includes the Media Access Control (MAC) sub-layer, monitors activity on the network before sending a data packet, recognizes boundaries between data packets, and regulates the flow of data packets between nodes. The Physical layer (layer 1) comprises the hardware that generates the actual signals that are transmitted through the physical medium of the connection, such as the wires of an Ethernet connection.

To accomplish their functions, the Transport, Network, and Data Link layers encapsulate data with header information, which originates in the Application layer before the data is placed on the network. Each layer appends its information to the front of the information passed to it from the prior layer, thereby encapsulating the information from the prior layer. The result is a data packet that contains data and layers of encapsulated header information.

Because a data packet contains layers of encapsulated information, the type of switching performed by a network switch depends upon the layer of information processed. A layer 2 switch forwards a data packet based upon the physical address of the destination node found in header information supplied by the MAC sub-layer of the Data Link layer. Because layer 2 switching usually occurs in hardware, it operates very quickly and is an efficient means of handling network transmissions within local area networks (LANs).

A network switch configured for layer 3 processing (usually referred to as a router) processes information added by the Network Layer. In an Internet Protocol (IP) based network, the layer 3 switch uses information from the IP header to calculate routes based upon logical addresses, such as IP addresses, rather than physical addresses.

Layer 4 network switches process information supplied by the Transport Layer. In the Internet environment, the Transport Layer includes Transmission Control Protocol (TCP) segments and/or Universal Data Protocol (UDP) datagrams. A layer 4 network switch uses information, such as port numbers, protocol bits, and IP source and destination addresses, to move network traffic across the Internet. Load balancing and prioritization of certain data traffic, such as Voice over IP, are two examples of the types of functions that require layer 4 processing.

A network switch configured for layer 4 processing often-times modifies one or more fields of the IP, TCP, or UDP header to complete routing. For example, a data packet that crosses from one Internet domain to the next may undergo Network Address Translation (NAT). NAT allows IP addresses to be reused across Internet domains, thus reducing the problem of IP address depletion. To translate IP addresses, a network switch must modify an IP source or destination address of the IP header before forwarding the data packet to its next hop. Because the checksum value contained in the IP header is calculated over packet fields including the IP source and destination fields, the header checksum must also be modified.

However, re-calculating a header checksum while maintaining switching performance requires substantial computational resources, especially if the network data packet contains a TCP segment or UDP datagram because the TCP or UDP checksum is calculated over both its header and data (payload) fields and the payload may be thousands of bytes long. To re-compute a TCP or UDP checksum, a network switch can buffer the entire TCP segment or UDP datagram, modify the header information, re-calculate the checksum, and forward the data packet before the next data packet is received. Although a buffering approach is useful in some situations, it can require lots of memory and may slow the performance of a switch.

One way to increase network switch performance is to configure the switch to update the header checksum incrementally over a portion of the TCP or UDP packet rather than by re-computing it over the entirety of the packet. Incremental update takes advantage of the additive properties of checksum calculation by adding and subtracting values to the original header checksum based upon the changes made to the data packet header. These short calculations eliminate the need to buffer and re-calculate the checksum over the entire packet. The details of incrementally updating the IP checksum can be found in the Internet Engineering Task Force RFC 1141 entitled "Incremental Updating of the Internet Checksum" and RFC 1624 entitled "Computation of the Internet Checksum via Incremental Update." The details of calculating an Internet checksum can be found in RFC 1071 entitled "Computing the Internet Checksum." All three titles are incorporated by reference herein.

Although RFC 1141 and 1624 provide an improved technique for computing TCP/UDP checksums, these specifications do not fully realize the performance improvement available using incremental checksum computations. Accordingly, there is a need for an improved approach for incrementally calculating TCP and UDP checksums.

SUMMARY OF THE INVENTION

It is an advantage of the present invention to provide a unique method for incrementally updating a header checksum in a network data packet. It is another advantage of the present invention to provide a unique method for updating a header checksum without having to recalculate it over the entire payload. Eliminating the need to recalculate the checksum over the payload reduces network switch latency and increases network switch performance.

In accordance with an embodiment of the invention, a packet processor divides an IP packet encapsulating a TCP segment or UDP datagram into two parts: a reduced header part and a payload-plus part. The reduced header part contains the header fields normally modified during layer 4 processing. The reduced header part may include, for example, the IP source and destination addresses, protocol bits, and, when applicable, the IPv6 next header field of the IP packet header. It may also include the source and destination ports and the sequence and acknowledgement numbers of the TCP or UDP header. The payload-plus part normally contains the data or payload portion of the TCP segment or UDP datagram and any IP header and TCP or UDP header fields not specifically included in the reduced header part. These divisions are exemplary, and other divisions between the two parts are within the scope and spirit of the invention.

Once the packet processor receives a data packet, the processor performs an intermediate calculation on the TCP or UDP checksum by subtracting from it a value equal to the reduced header part. Subtracting a value from a TCP or UDP checksum generally means adding the one's-complement sum of the value to the TCP or UDP checksum. The result is a checksum value for the payload-plus portion of the IP packet. This value is deemed, for purposes of the invention, the partial one's complement sum.

Next, the processor modifies one or more fields of the reduced header part during layer 3 or layer 4 processing and calculates a checksum value on the modified reduced header part. It then adds this checksum value to the partial one's complement sum to produce the incrementally updated checksum. The incrementally updated checksum then replaces the original checksum in the TCP segment or UDP datagram header before the data packet is forwarded to its next hop.

Other embodiments, methods, features and advantages of the invention will be or will become apparent to one with skill in the art upon examination of the following figures and detailed description. It is intended that all such additional embodiments, methods, features and advantages be included within the scope of the invention and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
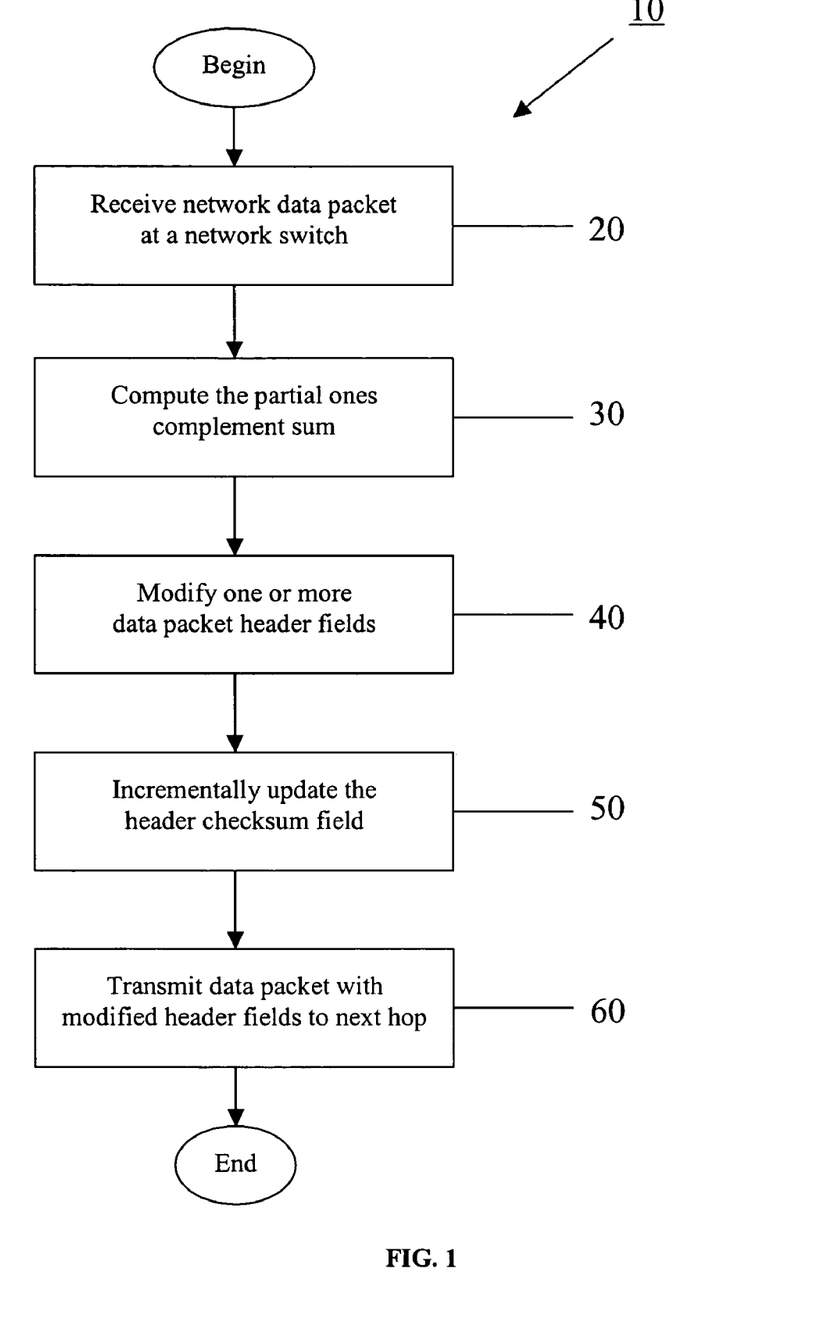
FIG. 1 is a flow chart illustrating a method of incrementally updating a checksum field in a network data packet header in accordance with an embodiment of the invention.

FIG. 1 illustrates a method 10 of incrementally updating a checksum value in a network data packet.

A checksum is an error-checking value that allows quick verification of the integrity of a received data packet, or parts thereof, and in a TCP/IP or UDP/IP environment, is the sixteen-bit, one's-complement of the one's-complement sum of all of the octets over which the checksum is computed. A received data packet contains a checksum field having a checksum value calculated by the source node. The receiving node recalculates the checksum over the same fields and compares the recalculated sum with the value in the checksum field. If the two values are the same, it is assumed that the data packet was transmitted error free.

The method steps comprise receiving a data packet containing a header checksum field at a network switch (step 20), computing a partial one's complement sum from the original header checksum (step 30), modifying one or more header fields of the data packet header (step 40), updating the header checksum field with a new header checksum value that reflects the changes made to the header fields (step 50), and transmitting the network data packet with the modified header to its next hop (step 60). Although the method itself can be applied generally to any network and protocol that allows arithmetic manipulation of its error correction scheme, the description below uses, by way of example only, an IP data packet containing a TCP segment or UDP datagram.

Figure 2:
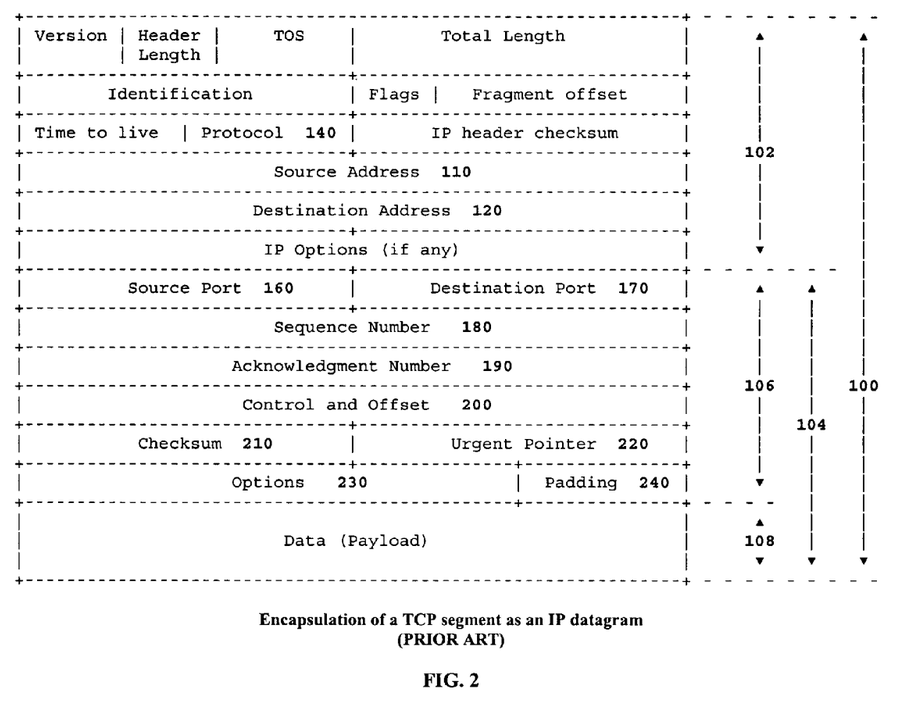
FIG. 2 is a diagram illustrating the encapsulation of a TCP segment as an IP datagram. The TCP segment appears in 32-bit wide format.

FIG. 2 shows the headers encapsulation of a TCP segment as an IP datagram. The source address 110, destination address 120, protocol bits 140, and other fields are part of the IP packet header 102. The IP packet header 102 precedes the TCP segment 104 in the IP packet 100. The TCP segment 104 consists of a TCP header 106 and the data or payload 108. The TCP header 106 includes a source port 160, a destination port 170, a sequence number 180, an acknowledgement number 190, control and offset fields 200, a TCP checksum 210, an urgent pointer 220, options 230, and padding 240 fields.

Referring to FIGS. 1 and 2, when a packet processor (includable in a network switch) implementing the method of this invention receives an IP packet 100 (step 20), it divides it into two parts for processing purposes, a reduced header part and a payload-plus part. In the preferred configuration, the reduced header part includes the source 110 and destination 120 addresses, the protocol bits 140, the source 160 and destination ports 170, and the sequence 180 and acknowledgement 190 numbers. Because the processor receives the IP header 102 and TCP header 106 before it receives the payload 108, the processor does not need to buffer the entire IP packet 100 before it begins processing the header fields. More importantly, because the method and system of this invention update the TCP checksum 210 without recalculating it over any portion of the payload 108, the method and system reduce network switch latency by limiting the number of mathematical computations to simple arithmetic computations over the header fields.

Once the processor locates the header fields that make up the reduced header part, the processor performs an intermediate arithmetic calculation on the TCP checksum 210 (step 30). The calculation consists of subtracting a value equal to the reduced header part from the TCP checksum 210. Because the TCP checksum 210 is the ones-complement (mathematical operation) of the ones-complement sum (summation using ones-complement numbering system) of all of the values over which the checksum is calculated, the subtraction is accomplished by adding the ones-complement (mathematic operation) of the ones-complement sum (summation using ones-complement numbering system) of the reduced header part to the ones-complement of the TCP checksum 210. The result is the ones-complement sum of the payload-plus portion of the IP packet 100 and, for purposes of this invention, is called the partial one's complement sum. It is created without having to re-compute it from the data or payload 108 portion of the IP packet 100.

The Table 1 below illustrates this computation.

TABLE 1

Nomenclature

| | |
|---|---|
| HC | Original TCP Checksum 210 value in IP packet 100 |
| C | Original checksum value, the ones-complement sum of all fields in IP packet 100 over which checksum is computed |
| PC | Partial Ones-complement sum |

TABLE 1-continued

| | |
|---|---|
| HC' | Updated TCP Checksum 210 replacing original TCP Checksum 210 in IP packet 100 |
| C' | Updated checksum value of IP packet 100 containing modified header |
| m | Ones-complement sum of the unmodified reduced header part |
| m' | Ones-complement sum of the modified reduced header part |

Intermediate Calculations

| | |
|---|---|
| HC = ~C | [Eqn. 1] |
| PC = C − m | [Eqn. 2] |
| = C + (−m) | |
| = C + ~m | |
| = ~HC + ~m | [Eqn. 3] |

Incremental checksum Calculation Algorithm

| | |
|---|---|
| C' = C + (−m) + m' | [Eqn. 4] |
| C = PC + m | [Eqn. 5] using Eqn. 2 |
| HC' = ~C' | |
| = ~(C + (−m) + m') | Using Eqn. 4 |
| = ~((PC + m) + (−m) + m') | Using Eqn. 5 |
| = ~(PC + m') | [Eqn. 6] |

By convention, checksum C is the ones-complement sum of all of the fields of the IP packet 100 over which the checksum is computed and is equal to the ones-complement sum of the reduced header part plus the ones-complement sum of the payload-plus part. Also by convention, the TCP Checksum 210 (HC) is the ones-complement of the checksum C. This is shown in Equation 1 above. As shown in Equation 2, the partial one's complement sum (PC) is by definition the value obtained by subtracting the ones-complement sum of the reduced header part (m) from the checksum C. Because the checksum C is the ones-complement of the TCP Checksum 210 (HC), this subtraction is accomplished by adding the ones-complement of the ones-complement sum of the reduced header part to the ones-complement of the TCP Checksum 210 (HC), as shown by derived Equation 3. The result is the ones-complement sum of the payload-plus portion of the IP packet 100.

Figure 6:
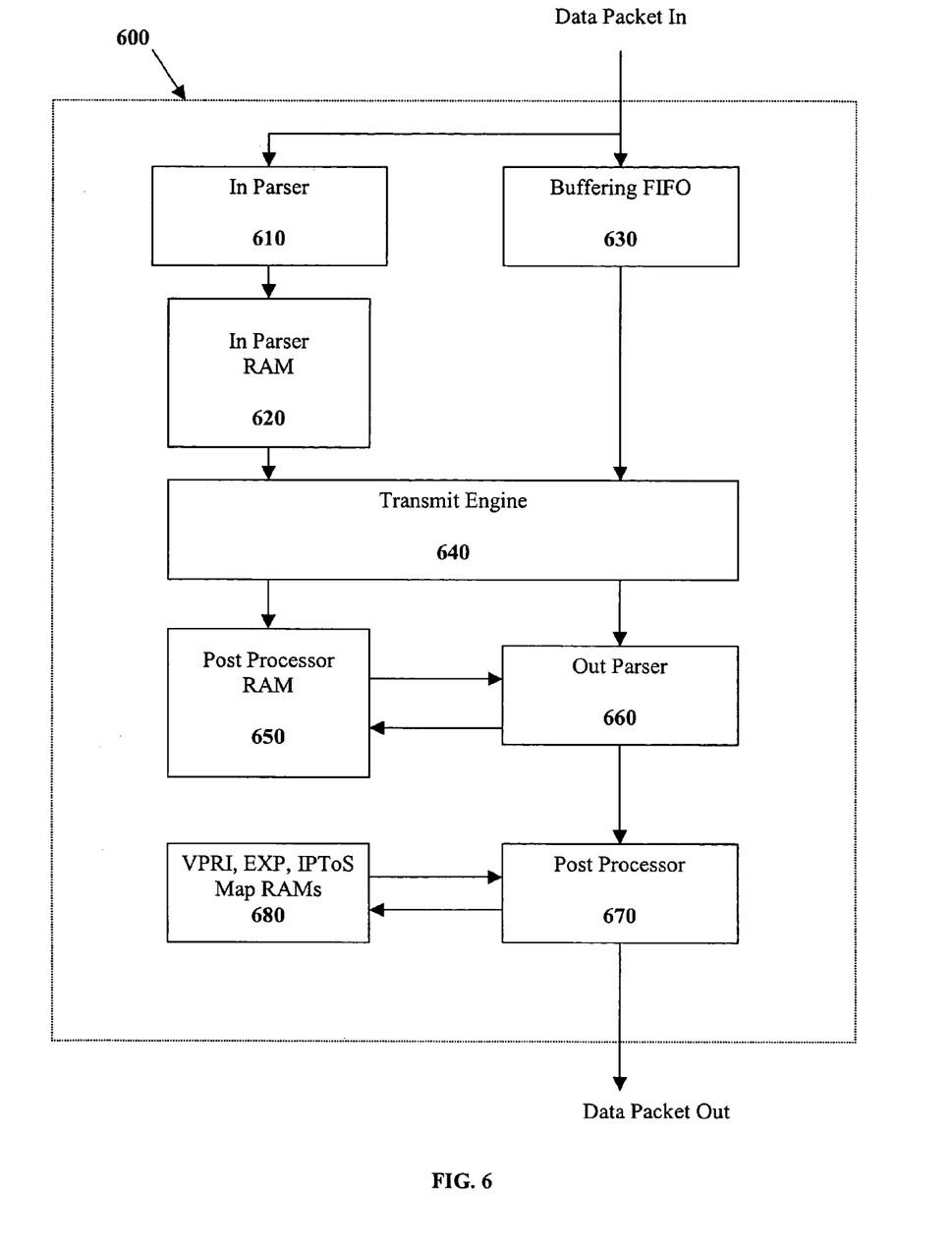
FIG. 6 is a functional block diagram of a unit of a network switch in accordance with another embodiment of the invention.

Referring now to FIG. 6, during layer 3 or layer 4 processing, a packet processor 600 receiving a network data packet may modify any of the IP 102 or TCP header 106 fields before forwarding the IP packet 100 to its next hop. As data packets arrive, they are written to the buffering FIFO 630. At the same time, the packets are also sent to the In Parser 610. The In Parser 610 extracts the IP 102 and/or TCP header 106 fields that make up the reduced header part. The In Parser 610 then calculates the partial one's complement sum using Equation 3 of Table 1 to operate on the extracted fields and the original TCP checksum 210. The results of the In Parser 610 are then written into the In Parser RAM 620 to be used by the Transmit Engine 640. As data packets arrive from the buffering FIFO 630, the Transmit Engine 640 may modify any fields within the network data packet (step 40), including any fields within the reduced header part. It also reads the data from the In Parser RAM 620 and forwards the partial one's complement sum and header fields from the reduced header part to the Post Processor RAM. The Transmit Engine 640 can be a microprocessor, a programmable device, a dedicated integrated circuit, or a part thereof, or any other device capable of being programmed or hardwired to perform data manipulation functions. The Transmit Engine 640 then forwards the modified data packet 100 to the Out Parser 660 for further processing.

Similar in functionality to the In Parser 610, the Out Parser 660 extracts information about the header fields. However, it does not compute the partial one's complement sum from the modified data packet. In addition, it forwards the partial one's complement sum stored in the Post Processor RAM 650 to the Post Processor 670. The Post Processor 670 then computes a new TCP checksum 210 (HC') by adding the ones-complement sum of the modified reduced header part to the partial one's complement sum and then finally by taking the ones-complement of the sum, as illustrated by Equation 6 of Table 1. Once the new TCP checksum 210 (HC') is calculated, the Post Processor 670 replaces the original TCP checksum 210 (HC) in the IP packet 100 with the new TCP checksum 210 (HC') (step 50) and forwards the IP packet 100 to its next hop (step 60). Like the Transmit Engine 640, the Out Parser 660 and the Post Processor 670 can be a microprocessor, a programmable device, a dedicated integrated circuit, or a part thereof, or any other device capable of being programmed or hardwired to perform data manipulation functions.

Figure 3:
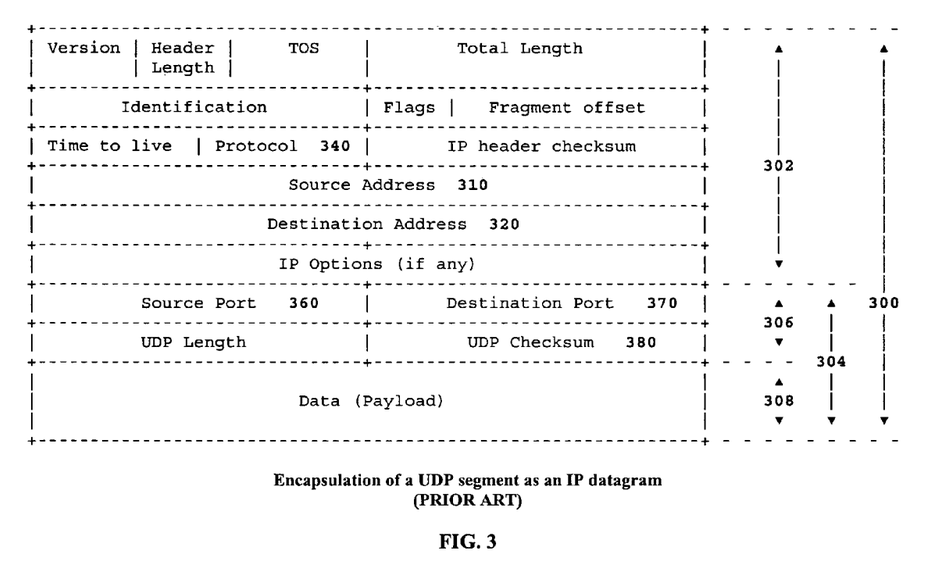
FIG. 3 is a diagram illustrating the encapsulation of a UDP segment as an IP datagram. The UDP datagram appears in 32-bit wide format.

FIG. 3 shows the headers of an IP packet 300 containing a UDP datagram 304 that are typically modified during data packet processing. The difference between the processing of a UDP datagram 304 versus a TCP segment 104 is that a UDP header 306 contains only a source port 360, a destination port 370, and a UDP checksum 380. The UDP header 306 does not contain a sequence number 180 and an acknowledgement number 190. Thus, the only change in the method described above is in the fields that comprise the reduced header part. The method 10 can be used to process an IP packet 300 containing a UDP datagram 304 where the reduced header part preferably comprises the following fields: the source 310 and destination 320 addresses, the protocol bits 340, and the source 360 and destination ports 370.

Figure 4:
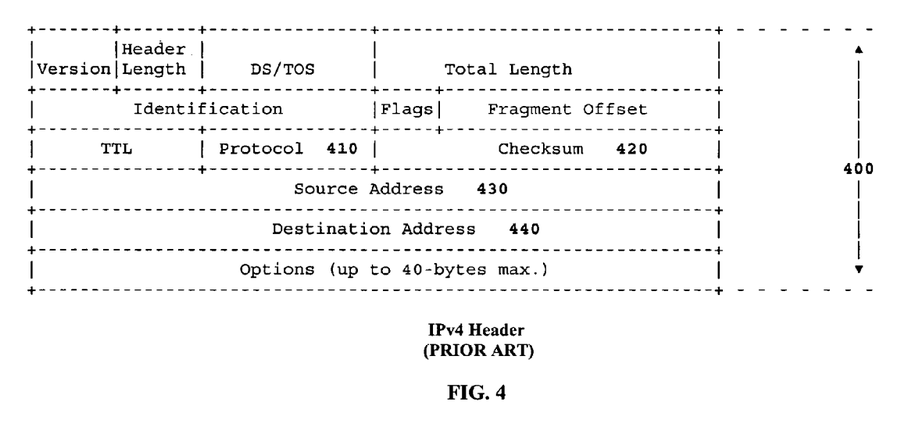
FIG. 4 is a diagram illustrating an IPv4 header as it would appear in a 32-bit wide format.

FIG. 4 illustrates an IPv4 header 400. The IPv4 header 400 includes, among other fields, protocol bits 410, an IPv4 header checksum 420, an IP source address 430, and an IP destination address 440. The IPv4 header 400 normally prefixes the TCP segment 104 of FIG. 2 or the UDP datagram 304 of FIG. 3 in a network data packet when a sending node utilizes version 4 of the Internet Protocol. The method 10 treats data packets containing version 4 headers no differently than the data packets 100, 300. However, the IPv4 header checksum 420 is a checksum of the IPv4 header fields only, whereas the TCP checksum 210 and the UDP checksum 380 cover certain fields in the IP header 102, 302, TCP and UDP header 106, 306 fields, and their payloads 108, 308. When processing a data packet containing an IPv4 header 400 where one or more fields of the IPv4 header 400 are to be modified, the reduced header part of the preferred embodiment comprises the source 430 and destination 440 addresses and the protocol bits 410.

Figure 5:
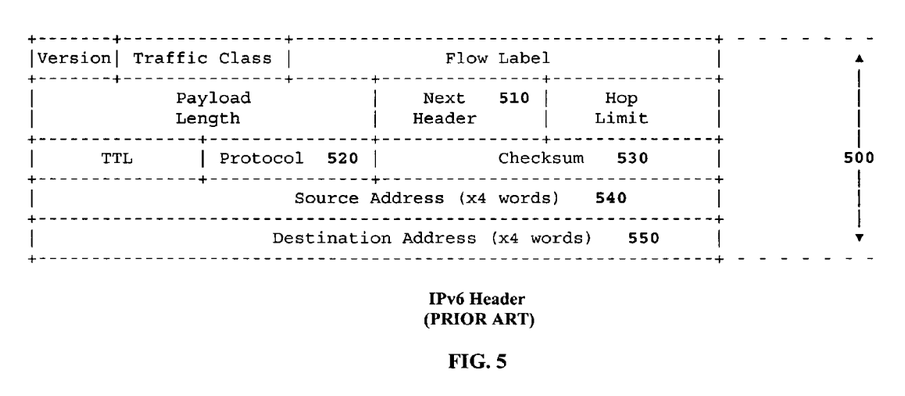
FIG. 5 is a diagram illustrating an IPv6 header as it would appear in a 32-bit wide format.

FIG. 5 illustrates an IPv6 header 500. Like the IPv4 header 400 of FIG. 4 and the IP header 102 of FIG. 2, it contains protocol bits 520, a source address 540, and a destination address 550. Unlike the IPv4 header 400 and the IP header 102, however, it contains a next header 510 field. The method disclosed herein treats data packets containing version 6 headers no differently than the IP data packets 100, 300, 400 described above, except that the reduced header part preferably includes the next header 510 field in addition to the protocol bits 520, the source address 540, and the destination address 550.

While various embodiments of the invention have been described, it will be apparent to those of ordinary skill in the art that many more embodiments and implementations are possible that are within the scope of this invention. For example, the method described above is not limited to the protocols specifically mentioned herein. It can apply to other protocols that allow arithmetic manipulation of their error correction schemes.

What is claimed is:

1. A method of incrementally updating a checksum in a network data packet header, the method comprising the steps of:
   calculating a partial one's complement sum by subtracting a reduced header part derived from the network data packet header from the checksum;
   modifying at least one field of the reduced header part of the network data packet header; and
   adding a value, comprising a checksum of the modified reduced header part, to the partial one's complement sum to create an incrementally updated checksum.

2. The method of claim 1 wherein the step of calculating the partial one's complement sum includes subtracting an IP source address, an IP destination address, and a plurality of protocol bits from the checksum.

3. The method of claim 2 wherein the step of calculating the partial one's complement sum further comprises subtracting a source port and a destination port.

4. The method of claim 3 wherein the step of calculating the partial one's complement sum further comprises subtracting a sequence number and an acknowledgement number.

5. The method of claim 1 wherein the network data packet contains an IPv6 header having at least a source address, a destination address, and a next header field.

6. The method of claim 5 wherein the step of calculating the partial one's complement sum includes subtracting the source address, the destination address, and the next header field from the checksum.

7. A method of incrementally updating a checksum in a network data packet header, the method comprising the steps of:
   receiving, at a packet processor, a data packet having a plurality of header fields comprising a source address, a destination address, and a plurality of protocol bits;
   calculating a partial one's complement sum by subtracting from the checksum at least one of the plurality of header fields;
   modifying the at least one of the plurality of header fields to create at least one modified header field;
   adding to the partial one's complement sum a checksum value of the at least one modified header fields to obtain an incrementally updated checksum; and
   transmitting the data packet having the at least one modified header field and incrementally updated checksum from the packet processor.

8. The method of claim 7 wherein the header fields further comprise a source port and a destination port.

9. The method of claim 8 wherein the header fields further comprise a sequence number and an acknowledgement number.

10. The method of claim 7 wherein the header fields are IPv6 header fields and comprise a source address, a destination address, and a next header field.

11. The method of claim 10 wherein the header fields are IPv6 header fields and comprise a source address, a destination address, and a next header field.

12. A method of incrementally updating a checksum in a network data packet header, the method comprising the steps of:
   receiving, at a network switch, a data packet having a plurality of header fields comprising a source address, a destination address, a plurality of protocol bits, a source port, and a destination port;
   calculating a partial one's complement sum by subtracting from the checksum at least one of the plurality of header fields;

modifying the at least one of the plurality of header fields to create at least one modified header field;

adding to the partial one's complement sum a checksum value of the at least one modified header field to obtain an incrementally updated checksum; and transmitting the data packet having the at least one modified header field and incrementally updated checksum from the network switch.

13. The method of claim 12 wherein the header fields further comprise a sequence number and an acknowledgement number.

14. A system for incrementally updating a network data packet checksum, the system comprising:

an input parser configured to identify one or more header fields that make up a reduced header part of an incoming data packet and to compute a partial one's complement sum from the reduced header part;

a buffer memory for buffering the incoming data packet; and a circuit connected to the buffer memory for modifying the reduced header part, and computing an incrementally updated network data packet checksum from the modified reduced header part and the partial one's complement sum.

15. The system of claim 14 wherein the reduced header part comprises a source address, a destination address, and a plurality of protocol bits.

16. The system of claim 15 wherein the reduced header part further comprises a source port and a destination port.

17. The system of claim 16 wherein the reduced header part further comprises a sequence number and an acknowledgement number.

18. The system of claim 14 wherein the reduced header part comprises a source address, a destination address, and a next header field.

19. A system for incrementally updating a network data packet checksum, the system comprising:

means for identifying one or more header fields that make up a reduced header part of the incoming data packet;

means for buffering the incoming data packet;

means for computing a partial one's complement sum from the reduced header part, and an incrementally updated network data packet checksum from the partial one's complement sum; and means for transmitting the data packet including the incrementally updated network data packet checksum to its next hop.

20. The system of claim 19 wherein the reduced header part comprises a source address, a destination address, and a plurality of protocol bits.

21. The system of claim 20 wherein the reduced header part further comprises a source port and a destination port.

22. The system of claim 21 wherein the reduced header part further comprises a sequence number and an acknowledgement number.

23. The system of claim 19 wherein the reduced header part comprises a source address, a destination address, and a next header field.

* * * * *